United States Patent [19]

Griffiths

[11] 4,240,304
[45] Dec. 23, 1980

[54] VALVE OPERATING SYSTEM

[76] Inventor: Edward E. Griffiths, 6499 Trinidad Dr., San Jose, Calif. 95120

[21] Appl. No.: 920,674

[22] Filed: Jun. 30, 1978

[51] Int. Cl.³ ............... F16K 31/05; G05G 9/00; G05G 11/00; G05G 5/06
[52] U.S. Cl. ...................... 74/471 R; 74/479; 74/527; 74/625; 137/635; 137/637; 251/130; 403/107; 403/109
[58] Field of Search ........... 74/471 R, 479, 625, 74/527; 403/107, 109; 137/635, 637; 251/57, 130

[56] References Cited

U.S. PATENT DOCUMENTS

| | | | |
|---|---|---|---|
| 1,713,402 | 5/1929 | Shivers | 251/130 |
| 2,516,642 | 7/1950 | Murphy | 74/527 X |
| 2,621,543 | 12/1952 | Rossmann | 74/625 |
| 2,885,893 | 5/1959 | Lane et al. | 74/527 X |
| 3,203,521 | 8/1965 | Frank | 192/96 |
| 3,392,987 | 7/1968 | Muller et al. | 74/527 X |
| 3,491,663 | 1/1970 | Morgan | 74/527 X |
| 3,560,033 | 2/1971 | Barkus | 403/107 |
| 3,963,051 | 6/1976 | Kuhlmann | 137/637 |
| 4,119,118 | 10/1978 | Patel | 251/57 |

*Primary Examiner*—Allan D. Herrmann
*Attorney, Agent, or Firm*—Flehr, Hohbach, Test, Albritton & Herbert

[57] ABSTRACT

Valve operating system which is particularly suitable for use in the remote control of valves such as the function control valves of a crane or loading apparatus. The system includes output shafts for connection to the operating levers of the valves and input shafts disposed telescopically of the output shafts. A drive motor is connected to the input shafts for moving the same in unison along their axes, the detent means are provided for selectively locking the input and output shafts in each pair together. The detent means are operated by electrically energized solenoids which can be controlled remotely, e.g. from a hand held control unit connected to the remainder of the system by a cable.

14 Claims, 6 Drawing Figures

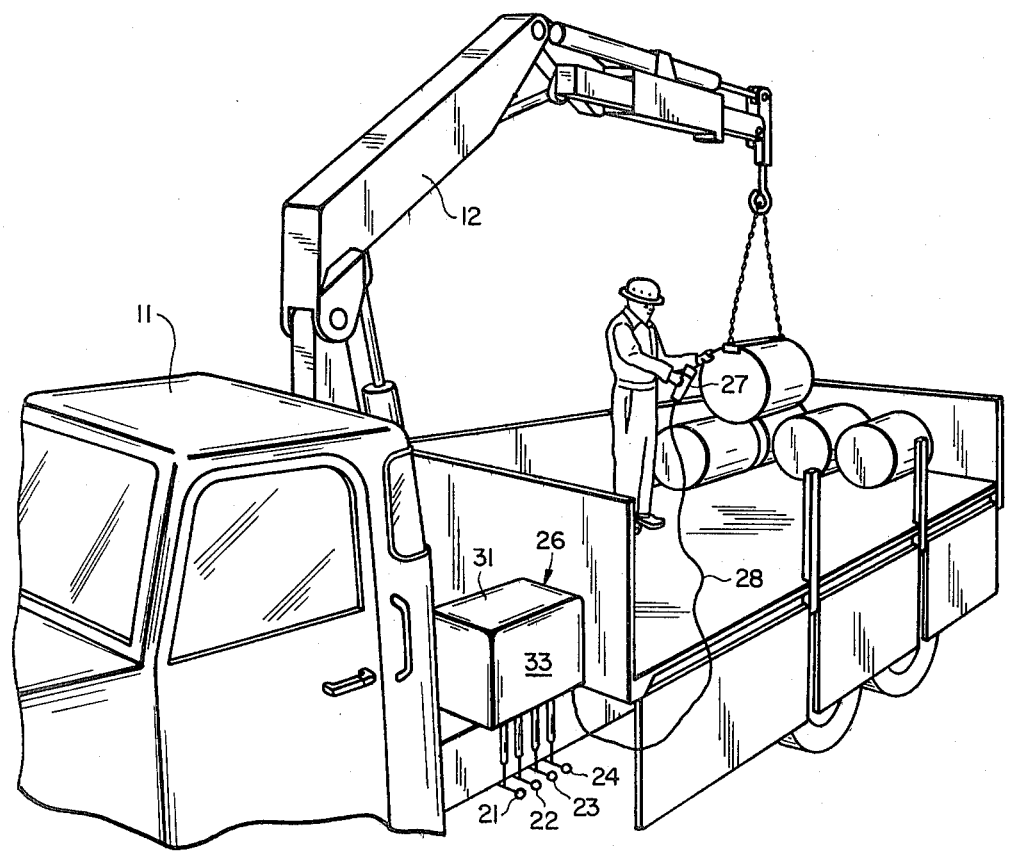
FIG__1
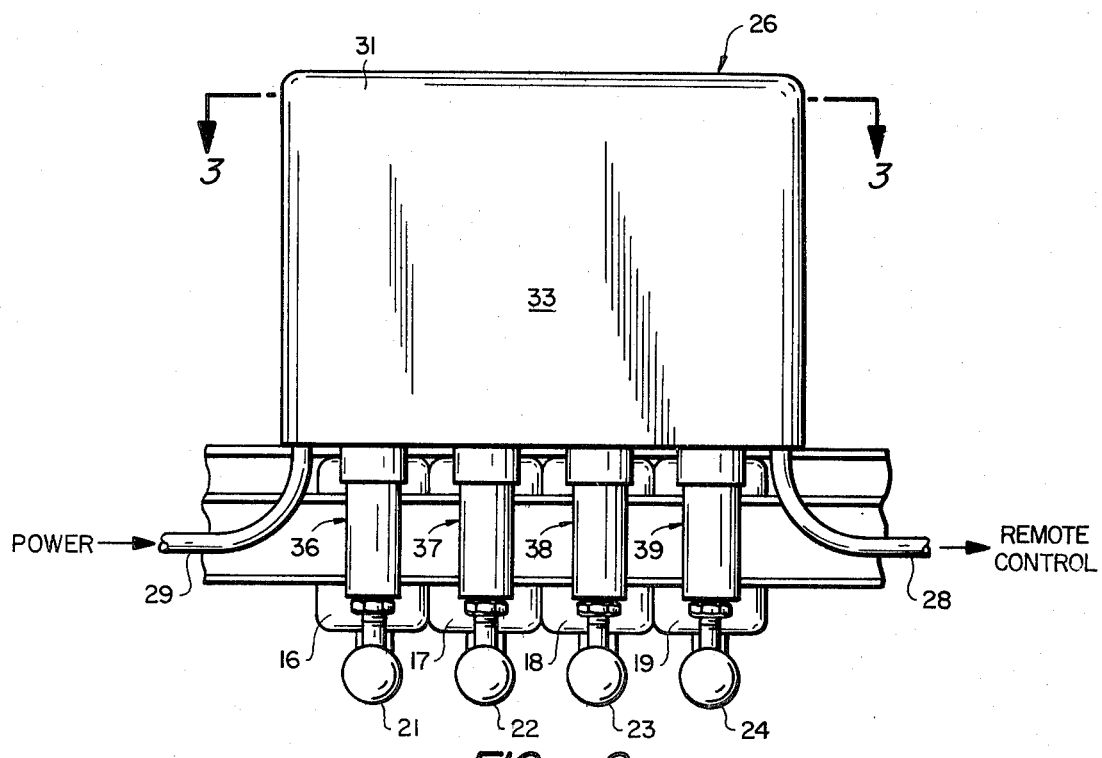
FIG__2

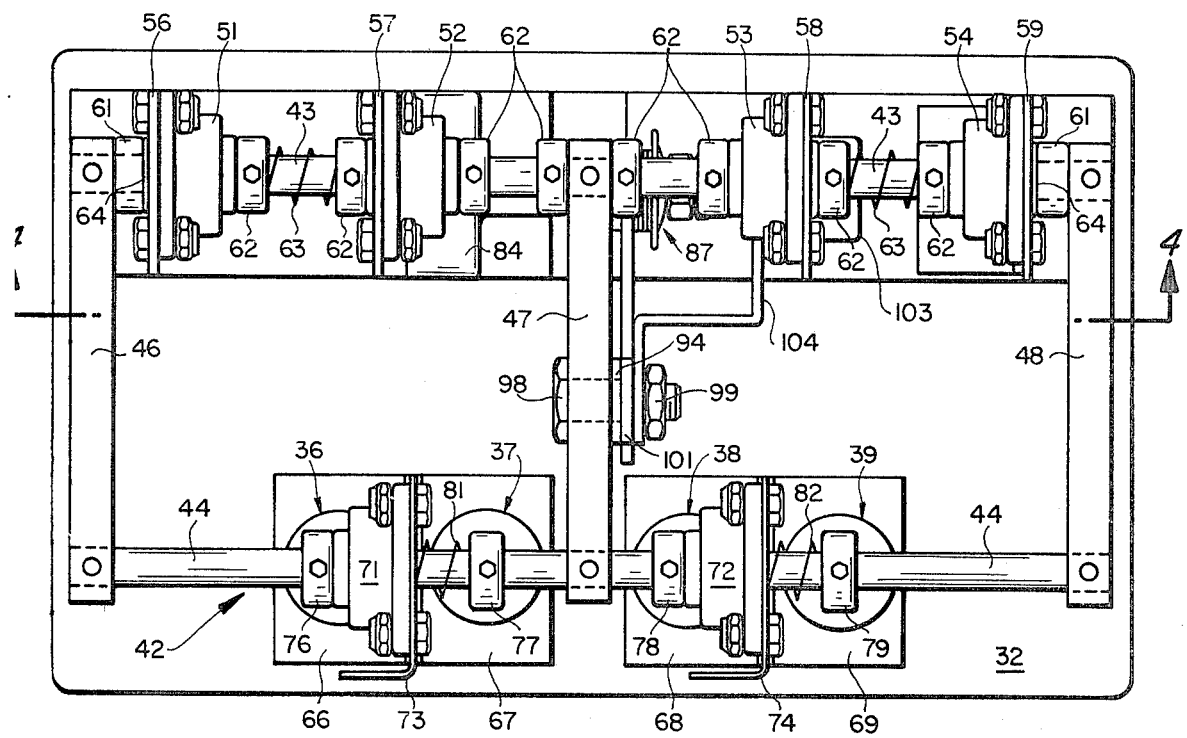
FIG_3
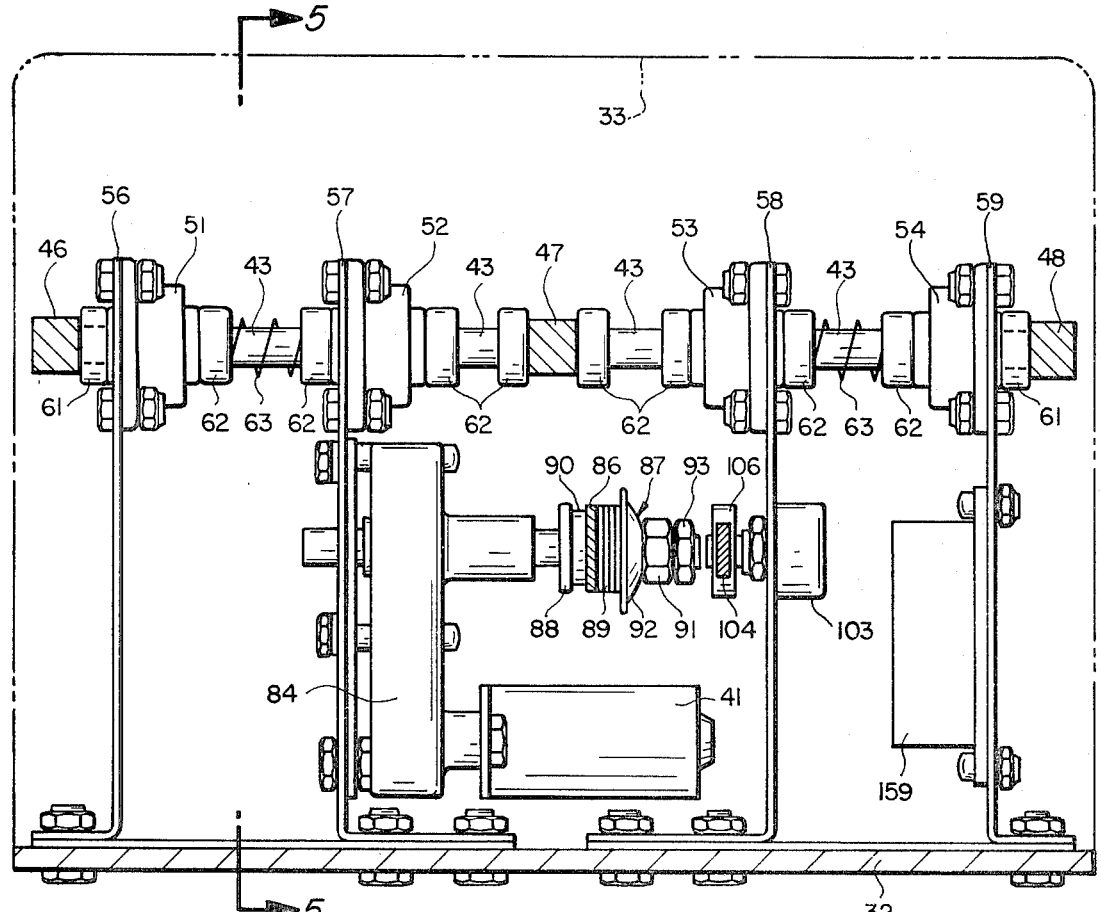
FIG_4

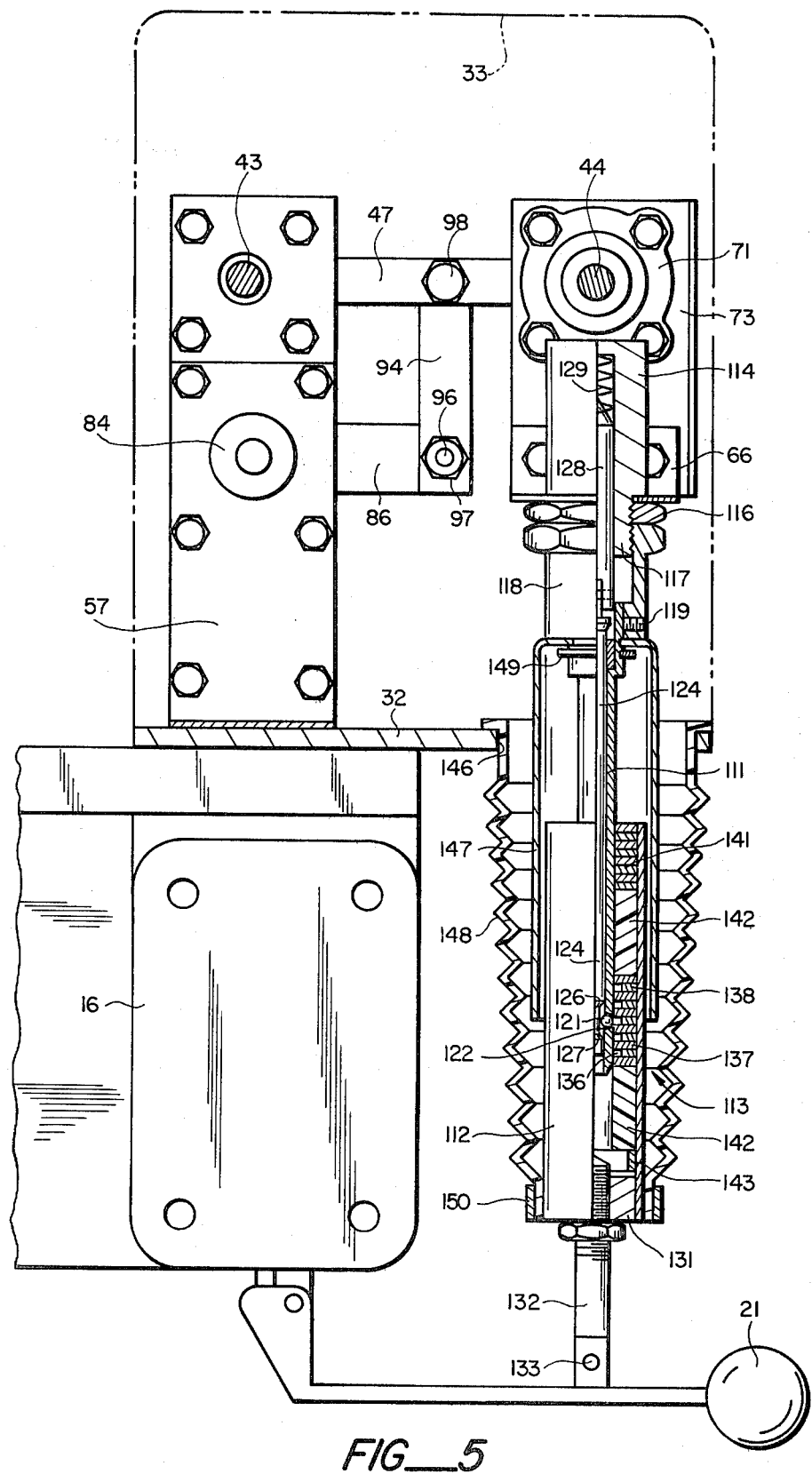
FIG_5

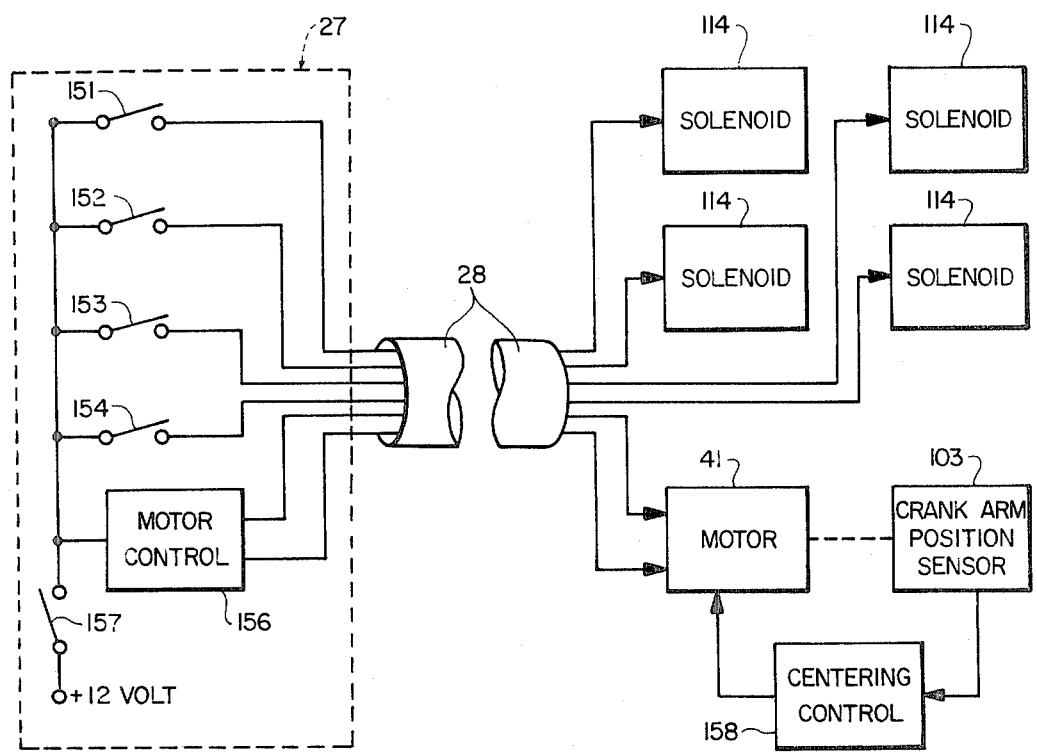
FIG_6

VALVE OPERATING SYSTEM

BACKGROUND OF THE INVENTION

This invention pertains generally to valve operators and more particularly a valve operating system for actuating hydraulic or pneumatic valves such as the control valves of an articulating crane or loading apparatus.

Hydraulically operated cranes and lifting devices generally have one or more manually operated valves for controlling the application of pressurized fluid to operating cylinders to control boom functions such as rotation, extension and lift. The valves are generally located in a fixed position on the crane or loader or on a truck or other vehicle on which the crane or loader is mounted, and the operating handles or levers for the valves are commonly arranged in a group near the valves. In the past there have been attempts to provide remote controls for such valves in order to permit the operator to move about and be near the load, rather than remaining at the valves. Such systems have been relatively complex and have generally required a separate motor or actuator for each valve.

SUMMARY AND OBJECTS OF THE INVENTION

The invention provides an improved valve operating system which is particularly suitable for use in the remote control of valves such as the function control valves of a crane or loading device. The system includes a plurality of output shafts for connection to the operating levers of the valves and a plurality of input shafts disposed telescopically of the output shafts. A drive motor is connected to the input shafts for moving the same in unison along their axes, and detent means are provided for selectively locking the input and output shafts in each pair together. The detent means are operated by electrically energized solenoids which can be controlled remotely, e.g. from a hand held control unit connected to the remainder of the system by a cable.

It is in general an object of the invention to provide a new and improved valve operating system.

Another object of the invention is to provide a system of the above character which is particularly suitable for use in the remote control of valves such as the function control valves of a crane or loading device.

Additional objects and features of the invention will be apparent from the following description in which one presently preferred embodiment is set forth in detail in conjunction with the accompanying drawings.

BRIEF DESCRIPTION OF THE DRAWINGS

FIG. 1 is a fragmentary perspective view of one embodiment of a truck-mounted crane or loading apparatus having a remote control system incorporating the invention.

FIG. 2 is a fragmentary elevational view of the valve operating system of the apparatus of FIG. 1.

FIG. 3 is a cross sectional view taken along line 3—3 in FIG. 2.

FIG. 4 is a cross sectional view taken along line 4—4 in FIG. 3.

FIG. 5 is a cross sectional view taken along line 5—5 in FIG. 4.

FIG. 6 is a simplified electrical block diagram of the control system of the apparatus of FIG. 1.

DESCRIPTION OF THE PREFERRED EMBODIMENT

In FIG. 1, the invention is illustrated in conjunction with a truck 11 having a hydraulically actuated articulating crane 12 mounted thereon. The functions of the crane (e.g. rotation, extension, lift, etc.) are controlled by valves 16–19 which are mounted on the frame of the truck behind the cab. Alternatively, the function control valves can be located on the frame of the crane or in other suitable locations. The valves have operating handles or levers 21–24 which extend outwardly from the valves and are pivoted for movement about a horizontal axis. A valve operating system 26 is mounted on the frame above the valves, with a hand held remote control unit 27 connected to the remainder of the system by a cable 28. Electrical operating power is supplied to the system by a cable 29.

The valve operating system includes a housing 31 comprising a generally rectangular base 32 and a cover 33. The cover is removably mounted on the base and secured thereto by suitable means such as screws (not shown).

Mounted within housing 31 are four identical valve operators 36–39 driven by a reversible drive motor 41 in a manner described hereinafter. While the system illustrated has four valves and four valve operators, any desired number of valves and operators can be employed, the number of operators being chosen to match the number of valves.

The valve operators are carried by a frame assembly 42 comprising generally parallel horizontally extending axles 43, 44 connected rigidly together by cross arms 46–48. Axle 43 is rotatively mounted in bearing blocks 51–54 mounted on upright supports 56–59 toward the rear of the housing, with floating spacers 61, lock collars 62, springs 63 and washers 64 maintaining the axle in the desired longitudinal position. Toward the front of the housing, valve operators 36–39 are pivotally mounted on axle 44 by means of support brackets 66–69 and bearing blocks 71, 72. The support brackets are generally L-shaped brackets which are bolted in oppositely facing pairs to vertically extending support plates 73, 74 to which the bearing blocks are attached. Collars 76–79 and springs 81, 82 retain the valve operators in desired longitudinal positions on axle 44.

The shaft of drive motor 41 is connected to the input of a speed reducing gear box 84 which is mounted on upright support 57, as best seen in FIG. 4. A crank arm 86 is connected to the output shaft of the gear box by means of a slip clutch 87. The slip clutch includes a body member 88 affixed to the gear box shaft, a spring 89 which urges the crank arm into frictional engagement with a plastic wear washer 90 which abuts against the clutch body, and a nut 91 for adjusting the tension of the spring and thereby the amount of slip permitted by the clutch. A cupped washer 92 is positioned between spring 89 and nut 91, and a jam nut 93 locks nut 91 in the desired position.

A connecting link or tie rod 94 extends between the free end of crank arm 86 and cross arm 47 of frame 42. The lower end of the connecting link is pivotally connected to the free end of the crank arm by a bolt 96 and nut 97, and the upper end of the link is pivotally connected to cross arm 47 by a bolt 98, nut 99 and washer 101.

A potentiometer 103 for sensing the position of crank arm 86 is mounted on support 58 in axial alignment with the output shaft of gearbox 84, and the crank arm is connected to the shaft of the potentiometer by an arm 104. One end of this arm is provided with an enlarged boss or collar 106 which is affixed to the potentiometer shaft, and the other end is affixed to the crank arm. As discussed more fully hereinafter, the potentiometer is utilized to provide a feedback signal for the motor to return the crank arm to a generally horizontal neutral or rest position.

Each of the valve operators includes an input shaft 111 affixed to the support bracket 66–69 for the operator, an output shaft 112 disposed telescopically of the input shaft and connected to the operating handle 21–24 of the valve associated with the operator, detent means 113 for locking the shafts together, and an electrically energized solenoid 114 for selectively actuating the detent means. When not locked together by the detent means, shafts 111, 112 are free to move axially of each other.

Solenoid 114 is affixed to the support bracket of the operator by a nut 116 on a threaded mounting boss 117 of the solenoid. Input shaft 111 is carried by a collar 118 threadly mounted on the lower end of boss 117, with a set screw 119 rigidly securing the shaft to the collar.

Input shaft 111 is a hollow shaft, and the detent means includes detent balls 121 which can move in a radial direction in openings 122 in the wall of the shaft. In one presently preferred embodiment, four detent balls are spaced peripherally about the shaft. An operating rod 124 for the detent mechanism is slidably mounted within the input shaft. This rod includes a portion of reduced thickness 126 bounded by axially inclined surfaces 127, the lowermost one of which serves as a cam surface for engagement with detent balls 121. The upper end of operating rod 124 is connected to the plunger 128 of solenoid 114 for movement between axially advanced and retracted positions within the input shaft. A return spring 129 in the solenoid urges the operating rod toward the advanced position in which the detent balls are in their retracted position between the inclined surfaces at a positive stop location.

Output shaft 112 is a hollow shaft of larger diameter than input shaft 111, and it is disposed coaxially about the input shaft. The lower end of the output shaft is provided with a plug 131 in which a clevis fork 132 is threadedly mounted. This fork is pivotally connected to the operating handle of the valve by a clevis pin 133.

A plurality of axially spaced detent stops 136 are carried by the output shaft for engagement with detent balls 121. The stops are defined by annular members 137, 138 of larger and smaller inside diameter disposed alternately within the shaft. The plurality of stops permit the input and output shafts to be locked together in different axial positions, and the number of stops can be chosen as desired. The position of the stop members within shaft 112 is established by spacers 141–143. Plug 131 and the uppermost spacer 141 are pressed or ridge welded into shaft 112 to form a unitary structure. The valve operators extend downwardly through openings 146 in the base of housing 31, with dust covers 147 and boots 148 protecting the internal parts of the operators. The dust covers are fabricated of a rigid material such as steel or copper and are retained on input shafts 111 by snap rings 149. The boots are fabricated of a flexible material such as rubber and are secured to the lower ends of output shafts 112 by band clamps 150.

Referring now to FIG. 6, the energization of solenoids 114 is controlled by switches 151–154 in remote control unit 27. These switches are normally open, and the solenoids are energized by closure of the respective switches. If desired, suitable logic can be provided for permitting only one of the solenoids to be energized at a time. The control unit also includes a motor control 156 and a "dead man" switch 157 which must be held in a closed position for the system to operate. In the preferred embodiment, the motor control comprises a potentiometer having a manually operable rocker or "butterfly" handle which controls the application of operating current to drive motor 41 to operate the same at a continuously variable speed in either direction. The control has a neutral center position, and the amount of current supplied to the motor increases as the handle is moved away from the neutral position in either direction. With this system, the valve handles to which the operators are connected can be quickly and accurately moved to any desired position throughout their range. Connections between the switches, motor control potentiometer solenoids and motor are made by a cable 28, as are power and ground connections. Potentiometer 103 is connected to a centering control 158 which operates the motor to return crank arm 86 to the horizontal rest or neutral position when motor control 156 is in its neutral position and none of the solenoids are energized. The motor control and other logic circuitry employed in the system are located in a module 159 mounted on support 59. Electrical connections to and from module 159 are conventional and have been omitted from the drawings for ease of illustration.

Operation and use of the valve operating system are as follows. It is assumed that the system is mounted on a truck or crane device and connected to the operating handles of the function control valves of a hydraulic crane in the manner described above. The valve operator solenoids are normally deenergized, and the input and output shafts of each operator are free to move axially of each other. When "dead man" switch 157 is closed, function control switches 151-154 and motor control 156 are operational for actuating the solenoids and motor. When drive motor 41 is energized, frame assembly 42 is raised or lowered in accordance with the direction of motor rotation, and the input shafts of the operators move axially within the output shafts. When one of the solenoids is energized, the operating rod 124 connected thereto is retracted. The axial movement of cam surface 127 forces detent balls 121 outwardly into locking engagement with one of the stops 136 carried by the output shaft. Thereafter, the output shaft moves in concert with the input shaft until the solenoid is deenergized. Upon deenergization of the solenoid, the detent mechanism is released, and the valve mechanism returns the operating handle to its free neutral position. When motor control 156 is returned to its neutral or "off" position, crank arm 86 returns to its horizontal rest or neutral position. In the event that "dead man" switch 157 is released while one of the function switches is closed, or the motor control is away from its neutral position, the function being performed is terminated immediately, and arm 86 returns to its neutral position. In a typical operating sequence, the operator continuously holds the "dead man" switch in its closed position, then closes the function switch to energize the solenoid associated with the desired function. He then actuates the motor control potentiometer to operate the motor at the desired speed in the desired direction. When the function has been performed, the function switch and the motor control potentiometer handle are released, and the crank arm and valve operating handle return to their rest or neutral positions.

The valves to which the system is connected can also be operated manually, if desired. When the solenoids are deenergized, the output shafts move freely, and the valves can be operated in the normal manner. Even when the solenoids are energized, the slip clutch provides a flexible coupling between the motor and the valve operators, and the clutch is adjusted to permit the system to be overridden manually.

The invention has a number of important features and advantages. It utilizes a single drive motor with a plurality of operators which move linearly along generally parallel axes to control the operation of valves with pivotally mounted handles. The system permits efficient one man operation of a crane or loading apparatus, and the system is flexible in that it can be manually overriden even when one of the operators is engaged. While the invention has been disclosed with specific reference to the function control valves of an articulating hydraulic crane, it will be understood that the invention can also be utilized with other types of cranes and lifting devices and with other hydraulic and pneumatic valves.

It is apparent from the foregoing that a new and improved valve operating system has been provided. While only one presently preferred embodiment has been described, as will be apparent to those familiar with the art, certain changes and modifications can be made without departing from the scope of the invention as defined by the following claims.

What is claimed is:

1. In a valve operator: an input member adapted to be connected to a drive source for movement in an axial direction, an axially movable output member positioned telescopically of the input member for connection to the operating member of a valve, detent means for locking the input and output members together for movement in concert, said members being free for axial movement relative to each other when not locked together by the detent means, and means for selectively actuating the detent means to lock the input and output members together.

2. The valve operator of claim 1 wherein the detent means comprises a radially movable detent member and an axially movable operating rod having an axially inclined cam surface for engaging the detent member and moving the same in the radial direction.

3. The valve operator of claim 2 wherein the means for actuating the detent means includes an electrically energized solenoid connected to the operating rod for moving the same in the axial direction.

4. The valve operator of claim 1 including a plurality of axially spaced detent stops carried by one of the axially movable members whereby said members can be locked together when they are in a plurality of axial positions.

5. In a valve operating system: a plurality of output members movable along generally parallel axes for connection to the operating members of a plurality of valves, a plurality of axially movable input members disposed telescopically of respective ones of the output members, motive means connected to the input members for moving said members in unison along generally parallel axes, detent means associated with each telescopically disposed pair of input and output members for locking said members together for movement in concert, the members in each pair being free for axial movement relative to each other when not locked together by the detent means, and means for selectively actuating the detent means to lock selected ones of the input and output members together.

6. The valve operating system of claim 5 wherein each of the detent means comprises a radially movable detent member and an axially movable operating rod having an axially inclined cam surface for engaging the detent member and moving the same in the radial direction.

7. The valve operating system of claim 6 wherein the means for actuating the detent means includes an electrically energized solenoid connected to each of the operating rods for moving the same axially of the input members.

8. The valve operating system of claim 5 wherein the motive means comprises an electrically energized motor and slip clutch means yieldably connecting the motor to the input members.

9. In a valve operator: an axially movable input shaft having a radially movable detent member, an axially movable output shaft extending coaxially about the input shaft for connection to the operating member of a valve and having a detent stop engagable by the detent member to lock the shafts together for movement in concert, the shafts being free to move axially of each other when the detent member is not engaged with the detent stop, an operating rod disposed coaxially within the input shaft and having an axially inclined cam surface for urging the detent member radially outward into engagement with the detent stop upon axial movement of the operating rod within the input shaft, and means for selectively moving the operating rod between axially advanced and retracted positions within the input shaft to engage or disengage the detent member and stop.

10. The valve operator of claim 9 wherein the output shaft has a plurality of axially spaced detent stops engagable by the detent member whereby the shafts can be locked together when they are in a plurality of axial positions.

11. The valve operator of claim 9 wherein the means for selectively moving the operating rod within the input shaft comprises an electrically energized solenoid interconnecting the operating rod and the input shaft.

12. The valve operator of claim 9 wherein the detent stop has square shoulders.

13. In a valve operating system: a selectively engageable operator movable in a linear direction and adopted for connection to the operating handle of a valve, rotary drive means, crank means interconnecting the drive means and operator whereby rotation of the drive means serves to move the operator in the linear direction, and a slip clutch interconnecting the drive means and crank means and permitting overriding manual movement of the valve handle.

14. The system of claim 13 wherein the operator includes an input shaft connected to the crank means, an output shaft disposed telescopically of the input shaft, and detent means for selectively locking the input and output shafts together, said shafts being free for axial movement relative to each other when not locked together by the detent means.

* * * * *